United States Patent
Gibson et al.

(10) Patent No.: US 10,137,612 B2
(45) Date of Patent: Nov. 27, 2018

(54) METHODS AND APPARATUS FOR MANUFACTURE OF OPHTHALMIC LENSES

(71) Applicant: CooperVision International Holding Company, LP, St. Michael (BB)

(72) Inventors: John Robert Gibson, Farnham Common (GB); Terence Michael Cook, Norwich (GB); James Bryan Cook, Beccles (GB)

(73) Assignee: CooperVision International Holding Company, LP, St. Michael (BB)

( * ) Notice: Subject to any disclaimer, the term of this patent is extended or adjusted under 35 U.S.C. 154(b) by 768 days.

(21) Appl. No.: 14/576,235

(22) Filed: Dec. 19, 2014

(65) Prior Publication Data

US 2016/0176074 A1 Jun. 23, 2016

(51) Int. Cl.

| | |
|---|---|
| *B29C 39/36* | (2006.01) |
| *B29D 11/00* | (2006.01) |
| *B29C 33/44* | (2006.01) |
| *B29L 11/00* | (2006.01) |
| *B29C 33/36* | (2006.01) |
| *B29C 39/00* | (2006.01) |
| *B29C 43/08* | (2006.01) |
| *B29C 43/50* | (2006.01) |

(52) U.S. Cl.
CPC .............. *B29C 39/36* (2013.01); *B29C 33/44* (2013.01); *B29D 11/00192* (2013.01); *B29C 33/36* (2013.01); *B29C 39/006* (2013.01); *B29C 43/08* (2013.01); *B29C 2043/5046* (2013.01); *B29L 2011/0016* (2013.01); *B29L 2011/0041* (2013.01)

(58) Field of Classification Search
CPC ....... B29C 39/36; B29C 33/44; B29C 39/006; B29C 33/36; B29D 11/00192
See application file for complete search history.

(56) References Cited

U.S. PATENT DOCUMENTS 4,836,858 A * 6/1989 Reinhart ................. A47L 13/08
134/1
4,909,969 A * 3/1990 Wood .................... B29C 33/448
264/1.1

(Continued)

FOREIGN PATENT DOCUMENTS

DE 29723514 U1 10/1998
EP 0339642 A2 11/1989

(Continued)

OTHER PUBLICATIONS

Search and Examination Report issued in corresponding United Kingdom Patent Application No. 1422765.6 dated Jun. 19, 2015 (8 pages).

(Continued)

*Primary Examiner* — Mathieu D Vargot
(74) *Attorney, Agent, or Firm* — Kilyk & Bowersox, P.L.L.C.

(57) ABSTRACT

A method of removing an ophthalmic lens from a lens mold portion is provided and includes reciprocally displacing a region of the mold portion and thereby causing an edge portion of the ophthalmic lenses to become detached from the mold portion. Related apparatus, methods of manufacturing ophthalmic lenses, delensing stations, and manufacturing times are provided.

20 Claims, 3 Drawing Sheets

(56) References Cited

U.S. PATENT DOCUMENTS

| | | |
|---|---|---|
| 5,160,749 A | 11/1992 | Fogarty |
| 5,238,388 A | 8/1993 | Tsai |
| 5,466,147 A | 11/1995 | Appleton et al. |
| 5,540,410 A | 7/1996 | Lust et al. |
| 5,540,543 A | 7/1996 | Lust et al. |
| 5,545,366 A | 8/1996 | Lust et al. |
| 5,681,138 A | 10/1997 | Lust et al. |
| 5,702,735 A | 12/1997 | Martin et al. |
| 5,716,540 A | 2/1998 | Matiacio et al. |
| 5,776,514 A | 7/1998 | Wu et al. |
| 5,850,107 A | 12/1998 | Kindt-Larsen et al. |
| 5,861,114 A | 1/1999 | Roffman et al. |
| 5,928,682 A | 7/1999 | Janca et al. |
| 5,938,988 A | 8/1999 | Lust et al. |
| 5,975,875 A | 11/1999 | Crowe, Jr. et al. |
| 5,980,184 A | 11/1999 | Lust et al. |
| 5,981,618 A | 11/1999 | Martin et al. |
| 6,007,229 A | 12/1999 | Parnell, Sr. et al. |
| 6,079,940 A | 6/2000 | Lust et al. |
| 6,176,669 B1 | 1/2001 | Lust et al. |
| 6,180,032 B1 | 1/2001 | Parnell, Sr. et al. |
| 6,186,736 B1 | 2/2001 | Lust et al. |
| 6,368,522 B1 | 4/2002 | Ansell et al. |
| 6,405,993 B1 | 6/2002 | Morris |
| 6,444,145 B1 | 9/2002 | Clutterbuck |
| 6,502,009 B1 | 12/2002 | Parnell, Sr. et al. |
| 6,511,617 B1 | 1/2003 | Martin et al. |
| 6,558,584 B1 * | 5/2003 | O'Neill ............ B29D 11/00192 264/1.1 |
| 6,592,356 B1 | 7/2003 | Lust et al. |
| 6,732,993 B2 | 5/2004 | Dean |
| 6,752,581 B1 | 6/2004 | Lust et al. |
| 6,827,325 B2 | 12/2004 | Hofmann et al. |
| 6,830,712 B1 | 12/2004 | Roffman et al. |
| 7,156,638 B2 | 1/2007 | Lust et al. |
| 7,156,641 B2 | 1/2007 | Ansell et al. |
| 7,516,937 B2 | 4/2009 | Hofmann et al. |
| 7,585,167 B2 | 9/2009 | Lawton et al. |
| 7,811,483 B2 | 10/2010 | Witko |
| 7,935,280 B2 | 5/2011 | Lawton et al. |
| 8,038,912 B2 | 10/2011 | Beebe et al. |
| 8,105,070 B2 | 1/2012 | Reynolds et al. |
| 8,221,659 B2 | 7/2012 | Beebe et al. |
| 8,287,269 B2 | 10/2012 | Dubey et al. |
| 2004/0061246 A1 * | 4/2004 | Cardiff ................ B29C 33/40 264/1.1 |
| 2005/0167038 A1 | 8/2005 | Torris et al. |
| 2006/0145369 A1 | 7/2006 | Lawton et al. |
| 2006/0145370 A1 | 7/2006 | Lawton et al. |
| 2006/0145372 A1 | 7/2006 | Jones et al. |
| 2007/0052117 A1 | 3/2007 | Arnet et al. |
| 2007/0267765 A1 | 11/2007 | Ansell et al. |
| 2008/0102151 A1 | 5/2008 | Perez et al. |
| 2014/0103552 A1 | 4/2014 | Nakahashi et al. |

FOREIGN PATENT DOCUMENTS

| | | |
|---|---|---|
| EP | 0882560 A2 | 12/1998 |
| EP | 0888871 A1 | 1/1999 |
| EP | 0919352 A1 | 6/1999 |
| EP | 1561560 A1 | 8/2005 |
| EP | 1752280 A2 | 2/2007 |
| EP | 1752281 A2 | 2/2007 |
| EP | 1545865 B1 | 1/2008 |
| JP | 04361010 A | 12/1992 |
| JP | 08300425 A | 11/1996 |
| WO | 2000059713 A1 | 10/2000 |
| WO | 2001074574 A2 | 10/2001 |
| WO | 2008039485 A1 | 4/2008 |
| WO | 2008078395 A1 | 7/2008 |

OTHER PUBLICATIONS

International Search Report and Written Opinion issued in corresponding International Patent Application No. PCT/GB2015/054048 dated Mar. 11, 2016 (11 pages).
International Preliminary Report on Patentability issued in corresponding International Patent Application No. PCT/GB2015/054048 dated Mar. 10, 2017 (7 pages).

* cited by examiner

METHODS AND APPARATUS FOR
MANUFACTURE OF OPHTHALMIC LENSES

TECHNICAL FIELD

The present invention concerns improvements in and relating to the manufacture of ophthalmic lenses. More particularly, the present invention concerns methods and apparatus for removing an ophthalmic lens, in particular, a contact lens, from a lens mold portion.

BACKGROUND OF THE INVENTION

One method of manufacturing ophthalmic lenses is by cast molding. In a cast molding process a lens precursor material is introduced into a lens-shaped cavity formed between lens mold portions. The lens precursor material is then cured and/or polymerized, thereby forming an ophthalmic lens. It is then necessary to remove the lens from the mold assembly. First the two mold portions are separated (known as demolding). Typically, following demolding, the lens remains in contact with one of the lens mold portions, often due, at least in part, to the material properties of the lens and the lens mold. Consequently, the next step in the cast molding process involves removing the lens from the mold portion (known as delensing).

Lenses at this stage of the manufacturing process are easily damaged, being susceptible to surface damage and tearing which renders the lens unusable. Moreover, the optical performance of a lens is strongly dependent on its shape. Therefore, any stretching of the lens during the demolding sequence may affect the optical performance of the lens, and therefore impact the ability of the lens to correct vision. Thus, in order to be effective, any manufacturing method must minimize the risk of damage to, or deformation of, the lens during removal from the lens mold portion.

As well as being easily damaged, the lens may be very flexible, i.e., the lens may have a very low elastic modulus. This is particularly true in the case of silicon hydrogel contact lenses but also applies to other ophthalmic lenses. In the case of a highly flexible lens, deformation of the mold carrying the lens may simply result in deformation of the lens, rather than successful delensing, because the lens does not favor its natural shape in the same way as a more rigid lens. Consequently, a more radical deformation may be required to detach the lens from the mold, thereby increasing the risk of damage to the lens or failure of the mold.

Methods for removing a lens from a mold portion may be categorized as mechanical methods and non-mechanical methods.

One known non-mechanical method of removing a lens from a mold portion is to soak the lens and the mold portion in a liquid solution such that the lens floats off of the mold. However, once hydrated or otherwise swollen with liquid, the lens is much more difficult to handle, which complicates downstream manufacturing processes. Such methods also significantly increase production time because of the length of time required for the lens to absorb the necessary amount of liquid.

U.S. Pat. No. 7,811,483 describes mechanical methods and systems for delensing ophthalmic lenses by using gas. A mold portion carrying a lens is radially compressed, and a gas, such as air, is directed towards the lens. The radial compression of the mold portion provides a void between the lens and the mold portion near the edge of the lens, which allows the gas to lift the edge of the lens. However, deforming the mold from the side can cause the lens to come off of the mold asymmetrically, resulting in difficulties in downstream manufacturing processes and increased risk of damage.

U.S. Pat. No. 8,105,070 also discloses the use of gas jets to lift the edge of a lens carried by a mold portion. This document describes applying a force in a first direction to diametrically opposed portions of the outer flanges of the mold while applying a force in a second, opposite direction, to the center of the mold, such that the mold is peeled away from the edges of the lens and can then be lifted by the gas jets.

U.S. Pat. No. 8,038,912 describes a method of delensing a lens by locating a circular shear ring against the lens-side surface of the mold. A plunger is then pressed against the back surface of the mold such that the mold is pressed between the shear ring and the plunger. The diameter of the plunger is less than that of the shear ring so the edge of the mold is peeled away from the lens as the plunger is pressed against the back of the mold.

The methods described above can be used to remove lenses from mold portions. However, severe deformation of the mold over a limited radius, as required in the above methods, may result in fracturing of the mold, thereby contaminating the lens and rendering it unusable. The degree of deformation also increases the risk of defects being produced on the lens surface. Consequently, it is advantageous to provide improved methods of removing an ophthalmic lens from a mold portion, which result in a lower rate of rejection of lenses because of damage caused by the delensing process.

SUMMARY OF THE INVENTION

The present invention, in a first aspect, provides a method of removing an ophthalmic lens from a lens mold portion carrying an ophthalmic lens. The method comprises reciprocally displacing a region of the mold portion and thereby causing an edge portion of the ophthalmic lens to become detached from the mold portion.

The invention is based on the realization that repeated reciprocal motion of a region of the ophthalmic lens can provide detachment of the mold at lower levels of mold deformation than are achieved using a single movement in one direction, thereby reducing the risk of lens defects and mold breakage.

The step of removing the ophthalmic lens from the lens mold portion may be referred to as a delensing step. Thus, a delensing step may comprise removing a given ophthalmic lens from a mold portion.

Reciprocal displacement is a repetitive back-and-forth motion. The displacement can be linear. Reciprocal displacement comprises a plurality of cycles (for example, at least 2, at least 3, or at least 5 cycles), each cycle comprising motion in a first direction, followed by motion in a second, opposite direction.

The invention, in certain aspects, relates to a method of manufacturing an ophthalmic lens including cast molding a lens in a mold assembly. The method can include a step of providing a lens mold assembly including a lens-shaped cavity formed by two or more lens mold portions. The method may comprise providing a lens precursor material in the lens-shaped cavity. The mold portions can be coupled together. The method can comprise a step of curing the lens precursor material. Alternatively, or additionally, the method comprises a step of polymerizing the lens precursor material. Thus, a lens may be formed in the lens-shaped cavity. The method can comprise a step of separating the lens mold assembly into its constituent lens mold portions (demolding). Once the mold assembly has been separated, i.e., following the demolding step, the lens is carried by a mold portion.

After the mold assembly has been separated, the method can comprise a step of removing the ophthalmic lens from the lens mold portion carrying the lens (delensing), as described herein. After delensing, the lens can be subjected to other processing steps. For example, the method can include a hydrating or fluid-swelling step. The hydrating or swelling step can be carried out after the delensing step. The lens can then be inspected, packaged, and sterilized, as understood by persons of ordinary skill in the art.

The step of curing and/or polymerizing the lens precursor material can include exposing the mold assembly to ultraviolet light. The step of curing and/or polymerizing the lens precursor material can include heating the mold assembly.

The mold sections can be formed by injection molding. The mold sections can comprise polymeric materials. For example, the mold sections can comprise thermoplastic polymeric materials, in particular, amorphous polymeric materials. The mold sections can comprise materials such as polystyrene, polycarbonate, acrylonitrile/butadiene/styrene compositions, cyclic olefin co-polymers, acrylics, and/or polysulfone. The mold sections can comprise semicrystalline resins such as acetal, polypropylene, polyethylene, nylon, polyethylene terephthalate, polyether ether keton, other polyolefins, and liquid crystal polymers. The mold sections can comprise polyethylene vinyl alcohol (EVOH), for example, injection molded EVOH.

The lens is of a non-hydrated and/or non-fluid-swollen lens type. Alternatively, the lens can be removed from the mold portion before being hydrated and/or fluid-swollen. The lens can be non-hydrated and/or non-swollen after curing until it has been removed from the mold portion.

The lens precursor material can be a polymerizable composition. The lens precursor material can comprise a monomer mixture. The precursor material can include a silicone-containing monomeric component.

Ophthalmic lenses typically comprise an optic portion that provides vision correction. This can be located in the center of the lens. The lens can comprise a peripheral portion that is located radially outside the optic portion. The peripheral portion can circumscribe the optic portion. The peripheral portion can be annular.

The lens mold assembly can be formed from two lens mold portions. Each mold portion can include a lens-shaped region. The lens-shaped region can include a surface that defines a surface of the lens. Each mold portion can include a flange region circumscribing the lens-shaped region. One of the mold portions can have a convex lens-shaped region that defines a posterior surface of the lens. Such a mold portion can be referred to as a male mold portion. One of the mold portions can have a concave lens-shaped region that defines an anterior surface of the lens. Such a mold portion can be referred to as a female mold portion. The mold portions can be configured such that, when placed together, the lens-shaped regions of the mold portions form a lens-shaped cavity. The mold portions can be configured such that, when placed together, one or more regions of the surface of the flanges of the assembled mold sections are in contact with one another.

The lens-shaped region of the mold portion(s) can include an optical surface that defines the optic portion of a lens. This region of the mold portion can be referred to as the optic region of the mold portion.

The mold portions can be "universal" mold portions. Thus, a single mold portion can have both a convex lens-shaped region and a concave lens-shaped region on opposite sides such that two universal mold portions can be assembled together into a mold.

The lens precursor material is can be placed on the concave surface of a first mold portion. A second mold portion can be placed in contact with the first mold section to form a lens-shaped cavity with the lens precursor material contained therein.

The ophthalmic lens can be a cast-molded lens. The ophthalmic lens can be a corneal inlay. The ophthalmic lens can be a corneal onlay. The ophthalmic lens can be an intraocular lens. The ophthalmic lens can be a contact lens.

A contact lens applicable to the invention can be a hydrogel lens, for example, a lens made of a silicone hydrogel material. The lens can be an extended wear silicone hydrogel contact lens and/or a daily wear silicone hydrogel contact lens.

The amplitude of the reciprocal displacement can be defined as the distance moved by the region of the mold portion in the first direction in a cycle. The distance moved in the first direction in a first cycle is not necessarily equal to the distance moved in the first direction in a second, subsequent, cycle. That is to say, the amplitude of the reciprocal displacement can vary from cycle to cycle. The amplitude can be at least 0.5 mm, for example, at least 1.5 mm. The amplitude can be less than 7 mm. The amplitude can preferably be about 5 mm. The initial amplitude can be 1.5 mm. The maximum amplitude can be 5 mm. Thus, the amplitude of the reciprocal displacement can vary with respect to time. The method of removing the ophthalmic lens from the lens mold portion can comprise varying the amplitude of the reciprocal displacement with respect to time. The distance moved in the first direction in an earlier cycle can be less than the distance moved in the first direction in a later cycle. The distance moved in the first direction in the first cycle can be less than the distance moved in the first direction in the second cycle. Thus, the amplitude of the displacement can increase with time. It has been found that gradually increasing the amplitude of the reciprocal displacement during delensing reduces the risk of the mold portion fracturing. Accordingly, the invention relates to molds and apparatus in which the amplitude of the reciprocal displacement in later cycles can be of an extent which would risk fracture of the mold portion if applied to the mold portion immediately without being preceded by lower amplitude cycles of displacement.

The amplitude of the reciprocal displacement can increase with time from an initial displacement to a maximum displacement during the delensing step. The amplitude of the reciprocal displacement during a subsequent delensing step can vary in substantially the same manner with respect to time as the amplitude varies in a previous step. The amplitude of the reciprocal displacement does not necessarily vary between every cycle in a delensing step. For example, a first set of cycles can all have a first amplitude. A second set of cycles can all have a second, different, preferably larger, amplitude. The first set of cycles can be followed by the second set of cycles during a single delensing step. There can be three cycles in a single delensing step. There can be more than three cycles in a single delensing step. For example, there can be four, five, or six cycles in a single delensing step. Each successive cycle can have a larger amplitude.

The displacement of the mold portions in accordance with aspects of the invention causes an edge portion of an ophthalmic lens to become detached from the mold portion. The displacement and the apparatus used for providing the displacement can be arranged so that the greatest displacement is applied to the mold portion in the region on which the edge of the ophthalmic lens is held. For example, the greatest displacement can be provided to an annular ring on the mold portion, which is in the region on which the ophthalmic lens is held. The displacement can be applied to the mold portion opposite the mold portion attached to the lens. For example, the lens can sit on the upper surface and the displacement can be applied from below.

A suction head can be used to remove the lens from the mold portion. A portion of the suction head can contact the lens. The suction head can be connected to a robotic arm. The robotic arm can move the suction head in three dimensional space, i.e., in three orthogonal directions. Thus, the robotic arm can move a lens attached to the suction head from a first location to a second location that is spaced apart from the first location.

The method of removing the ophthalmic lens from the lens mold portion can comprise moving the suction head synchronously with the reciprocal motion of the mold portion. As a result of moving the suction head synchronously with the reciprocal motion of the mold portion, the lens carried by the mold portion is continually exposed to suction, thereby minimizing the risk of the lens being dislodged. Moving the suction head synchronously with the reciprocal motion of the mold portion can maintain a substantially constant distance between the suction head and the lens, even as the lens is displaced reciprocally during delensing.

The method of removing the ophthalmic lens from the lens mold portion can comprise blowing gas towards the edge portion of the ophthalmic lens. Gas can be directed towards a single location on the outer circumference of the lens. Gas can be directed towards a portion of the outer circumference of the lens. Gas can be directed towards a plurality of locations spaced circumferentially around the edge of the lens. Once the edge portion has been lifted, the gas can penetrate between the lifted edge portion and the mold portion, thereby facilitating the separation of the lens from the mold. The gas can be air. The gas can be blown towards the edge portion of the ophthalmic lens before reciprocal displacement of the mold portion begins. The gas can be blown towards the edge portion of the ophthalmic lens while the mold portion is being reciprocally displaced. The gas can be directed as a continuous stream of gas. The gas can be directed in a pulsatile manner. For example, the gas can be directed in a series of short pulses.

The gas can be blown towards the edge portion of the ophthalmic lens before the edge portion has become detached from the mold portion by the reciprocal displacement of the mold portion. The gas can be blown towards the edge portion of the ophthalmic lens after the edge portion has become detached from the mold portion.

According to a second aspect of the invention, there is provided a method of manufacturing an ophthalmic lens using lens mold portions, wherein the method comprises removing the ophthalmic lens from a lens mold portion in accordance with the first aspect of the invention.

According to a third aspect of the invention, there is provided an apparatus for removing an ophthalmic lens from a lens mold portion. The apparatus can comprise: (i) a platform for retaining the lens mold portion; and (ii) a reciprocating member arranged to reciprocally displace a region of the lens mold portion when the lens mold portion is retained by the platform. The reciprocating member can contact the mold portion on the side of the mold portion opposite the lens. Contact between the reciprocating member and the mold portion can be maintained during the reciprocal displacement.

The reciprocating member can move a first distance in a first direction and then the reciprocating member can move a second distance in a second direction that is opposite the first direction. The movement through the first distance followed by the movement through the second distance constitutes a cycle. The number of cycles, their timing, speed, amplitude, and variations thereof, may be as described above in reference to the first aspect of the invention.

The apparatus can comprise a clamp for clamping the mold portion in a fixed position on the platform. The clamp can act on the outer circumference of the mold portion. The clamp can contact a flange portion of the mold portion. The clamp can contact the flange on the same side of the mold portion on which the lens sits. The clamp can contact the flange portion around all, or the majority, of the circumference of the mold portion. The clamp can compress the outer circumference of the mold portion.

The clamp can define a circular aperture. In use, the circular aperture and the mold portion can be concentric. In use, the circular aperture and the lens can be concentric. The clamp can comprise a plate. The clamp can be a plate defining a circular aperture. The diameter of the circular aperture can be less than the diameter of the mold portion. The diameter of the circular aperture can be greater than the diameter of the optic region of the mold portion.

The reciprocating member can comprise an end portion arranged to contact the retained lens mold portion so as to provide the reciprocal movement of the region of the mold portion. The reciprocating member can comprise a non-planar end portion shaped to complement the mold portion. The end portion can be circular when viewed in plan. The end portion can be formed monolithically with the reciprocating member. The end portion can be cup-shaped. The end portion can be concave. The end portion can be convex. The diameter of the end portion can be less than the diameter of the circular aperture.

The reciprocating member can be arranged such that in use the end portion contacts the center of the mold portion. The diameter of the end portion can be greater than the diameter of the optic portion of the mold.

The end portion of the reciprocating member and the circular aperture can define an annulus on the mold portion. The annulus can be the region of the mold located radially outside of the end portion of the reciprocating member but within the circular aperture. The annulus can be outside the optic portion of the mold portion.

The apparatus can further comprise a suction head wherein the suction head is arranged and configured such that in use the suction head is located on the side of the mold portion opposite the reciprocating member and moves substantially synchronously with said reciprocating member.

The suction head can comprise an end surface including at least one vacuum port. The end surface can be convex. In use, the negative pressure produced by the at least one vacuum port can be used to hold the lens against the end surface. The suction head can comprise a flexible contact element. The flexible contact element can be resilient. The flexible contact element can include the end surface. The flexible contact element can be made from an elastomeric material. The flexible contact element can be made from silicone rubber. The suction head is a vacuum head.

The apparatus can further comprise a robotic arm. The suction head can be attached to the robotic arm. The robotic arm can be arranged and configured to move the suction head substantially synchronously with the reciprocating member.

The apparatus can further comprise a blower arranged to blow air towards an edge of a lens attached to the mold portion.

The blower can comprise one or more air ducts. The blower can be arranged to move with the clamp. The blower can include one or more air ducts located within the clamp. The blower can include one or more air ducts attached to the clamp. The blower can include one or more air ducts located within the clamping plate.

The platform can comprise a recess in a substantially flat surface. The mold portion can sit within the recess.

The reciprocating member can pass through an aperture in the platform to contact the mold portion.

The apparatus can be used for delensing from a female mold portion. The platform can comprise a concave recess within a substantially flat surface. The reciprocating member can pass through an aperture in the center of the concave recess, to contact the mold portion.

The apparatus can include a controller to control the reciprocating member. The controller can be arranged and configured to move the reciprocating member through a predetermined number of cycles for each delensing step. The controller can be arranged and configured to move the reciprocating member until a control signal indicates the lens has been removed from the mold.

According to a fourth aspect of the invention, there is provided a delensing station comprising an apparatus for removing an ophthalmic lens from a lens mold portion in accordance with the second aspect of the invention.

The delensing station can be positioned adjacent to a conveyor for conveying mold portions to the delensing station for delensing. The conveyor can comprise a substantially flat surface containing a recess. The substantially flat surface can contain a plurality of recesses. The conveyor can be linear. The conveyor can comprise a turntable. The turntable can rotate to bring a recess into alignment with the delensing station. The turntable can rotate to bring a recess into alignment with the reciprocating member. The turntable can rotate to bring a recess into alignment with the clamp.

According to a fifth aspect of the invention, there is provided a manufacturing line for the production of ophthalmic lenses, wherein the manufacturing line comprises a delensing station in accordance with the third aspect of the invention.

The manufacturing line can comprise a curing station upstream of the delensing station. The lens precursor material contained within a mold assembly can be cured at the curing station.

The manufacturing line can comprise a demolding station upstream of the delensing station. The mold assembly can be separated into its constituent mold portions at the demolding station. The lens can be retained in the concave mold portion after the mold assembly is separated at the demolding station. The lens-carrying mold portion can be located in a recess in a conveyor for the demolding step. The demolding station can be located adjacent to the conveyor. The lens carrying mold portion can be transported between the demolding station and the delensing station by the conveyor.

The manufacturing line can comprise a hydrating station downstream of the delensing station. The lens can be hydrated at the hydrating station after it has been removed from the mold.

The manufacturing line can include a packaging station downstream of the hydrating station. The hydrated lens can be packaged at the packaging station.

Any features described with reference to one aspect of the invention are equally applicable to any other aspect of the invention, and vice versa.

BRIEF DESCRIPTION OF THE DRAWINGS

Various embodiments of the invention will now be described, by way of example only, with reference to the accompanying schematic drawings, of which.

DETAILED DESCRIPTION

Figure 1:
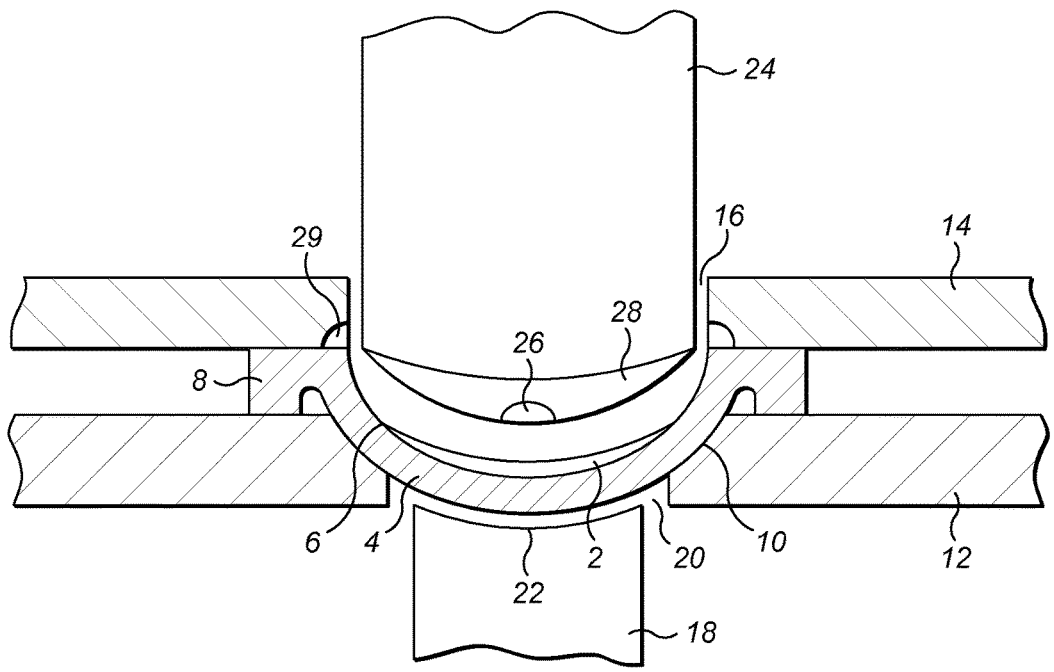
FIG. 1 is a schematic cross section of an apparatus for removing a lens from a mold portion according to a first exemplary embodiment of the invention.

FIG. 1 shows, in cross-section, an ophthalmic lens 2 carried by a mold portion 4. Mold portion 4 has a concave lens-shaped region 6 and peripheral flanges 8. Ophthalmic lens 2 is carried in concave lens-shaped region 6 on the top side of the mold portion. Mold portion 4 rests in a recess 10 formed in a flat horizontal surface 12. A clamping plate 14 contacts the top surface of flanges 8. Clamping plate 14 has a circular aperture 16 located concentrically with mold portion 4. Air vents 29 are located on the portion of plate 14 forming aperture 16. A reciprocating member 18 is located beneath a recess aperture 20 formed in the center of the bottom of concave recess 10. End portion 22 of reciprocating member 18 is concave and, in this example, matches the shape of the underside of mold portion 4. A vacuum head 24 is positioned above lens 2. The end of vacuum head 24 comprises a convex contact element 28 and includes a vacuum port 26.

In use, end portion 22 of reciprocating member 18 contacts the bottom of mold 4 via recess aperture 20. End portion 22 moves upwards, thereby exerting a force on the bottom of mold 4 and vertically displacing a central region of the mold (see FIG. 2). End portion 22 then moves downwards while maintaining contact with the bottom of mold 4 such that the displaced region of the mold moves back towards its original position. In use, convex end portion 28 of vacuum head 24 sits just above the lens. Vacuum head 24 mirrors the movements of the end portion. As the bottom of mold 4 is displaced upwards, vacuum head 24 moves upwards, and as the bottom of mold 4 moves downwards, vacuum head 24 moves downwards. Consequently, the distance between lens 2 and vacuum head 24 remains substantially constant during a cycle. The resilient end portion 28 of the vacuum head accommodates any misalignment as the vacuum head moves in synch with the reciprocating member, thereby reducing the risk of damage to the lens. This cycle is repeated, with the distance moved by member 18 (and therefore suction head 24) in each cycle increasing with time until an edge of lens 2 lifts from mold 4. During the movement of reciprocating member 18, air vents 29 direct gas towards the edge of the lens, which accelerates the process of detachment once the edge of lens 2 has lifted. Once lens 2 is detached, the negative pressure generated by vacuum port 26 holds lens 2 in contact with vacuum head 24.

Figure 2:
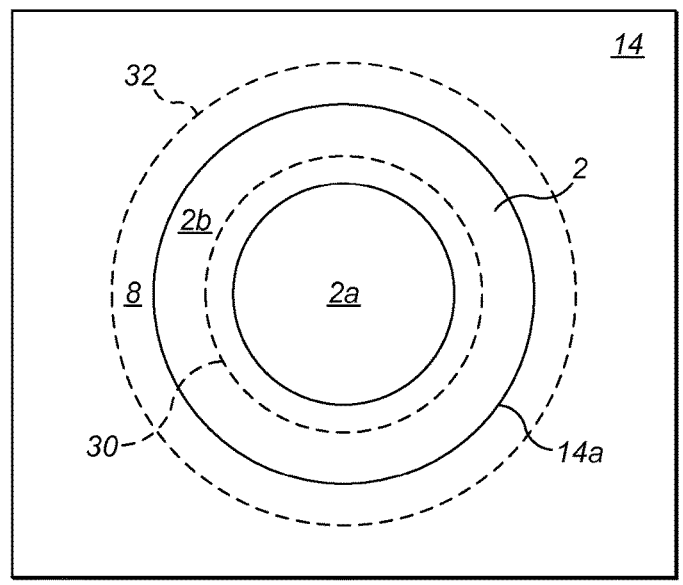
FIG. 2 is a schematic plan view of a mold portion carrying a lens when positioned in the apparatus of FIG. 1.

FIG. 2 shows a plan view of lens 2 when clamping plate 14 is in place. Plate 14 defines a circular aperture 16 through which lens 2 is visible. An optical region 2a of the lens, which appears circular when viewed in plan, is located in the center of lens 2 and is surrounded by an annular peripheral region 2b. Circular dashed line 30 denotes the outer circumference of end portion 22 when in contact with the mold. End portion 22 appears circular when viewed in plan in this figure. The outer circumference of end portion 22, as shown by line 30 in FIG. 2, is outside optical region 2a. Circular dashed line 32 denotes the outer circumference of flange 8 of mold portion 4. The radius of mold portion 4 is greater than the radius of circular aperture 16 and therefore line 32 is located radially outside the aperture.

In use, the outer edge of end portion 22, as denoted by dashed line 30, and aperture 16 as delimited by plate 14 (edge portion 14a defines the edge of aperture 16), define an annular region of the mold portion. When the center of mold portion 4 is moved by end portion 22, the annulus is repeatedly stretched and then allowed to relax by the cooperating action of reciprocating member 18 and clamp 14. As the annulus is stretched, the edge of lens 2 lifts from mold portion 4.

Figure 3:
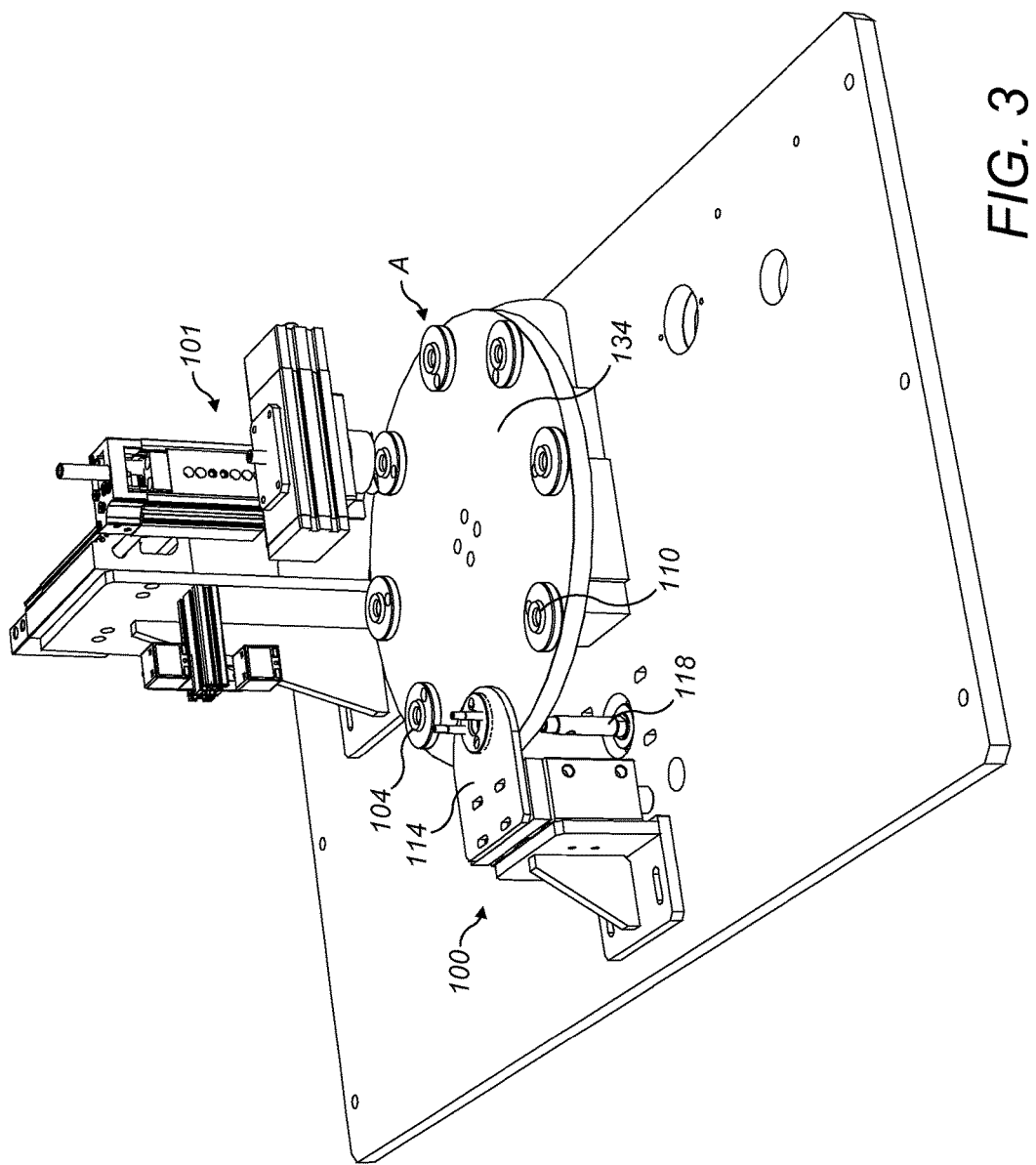
FIG. 3 is a delensing station in accordance with a second exemplary embodiment of the invention.

FIG. 3 shows a delensing station 100 adjacent to a circular turntable 134 that contains a plurality of circumferentially spaced recesses 110 in which mold portions 104 are located. In FIG. 3, a clamp 114 is shown clamping a mold portion 104 at delensing station 100. A reciprocating member 118 can be seen beneath turntable 134. Also located adjacent to the turntable is a demolding station 101 which is spaced apart from delensing station 100 around the circumference of the turntable 134. A lens pallet (not shown) containing a plurality of recesses is located adjacent to delensing station 100.

In use, mold assemblies 104, each containing a cured lens (not shown), are deposited in respective recesses 110 at location A. The turntable 134 then rotates counter-clockwise until recess 110 is aligned with demolding station 101. The mold assembly is then separated and concave mold portion 104 carrying the lens remains in recess 110 while the convex mold portion (not shown) is removed. The turntable 134 then rotates counter-clockwise until recess 110 is aligned with delensing station 100.

Figure 4:
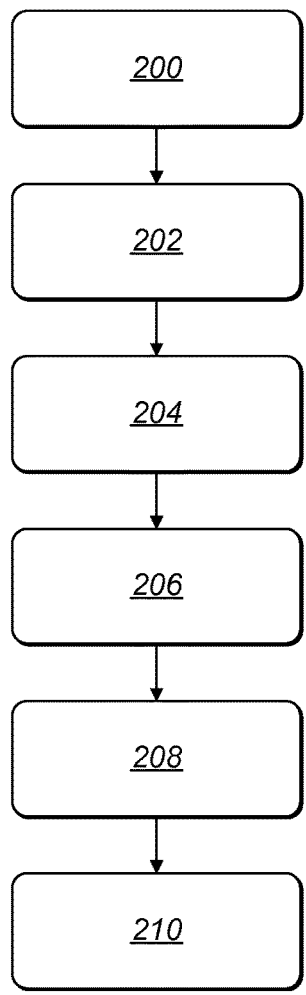
FIG. 4 is a flow chart depicting the process for manufacturing a cast-molded lens according to a first exemplary method of the invention.

FIG. 4 shows a flow chart of the manufacturing process. The process comprises a step 200 of providing a mold assembly containing lens precursor material, a curing step 202, a mold separation step (demolding step) 204, a step 206 of removing the lens from the mold (delensing step), a hydrating step 208, and a packaging step 210.

Figure 5:
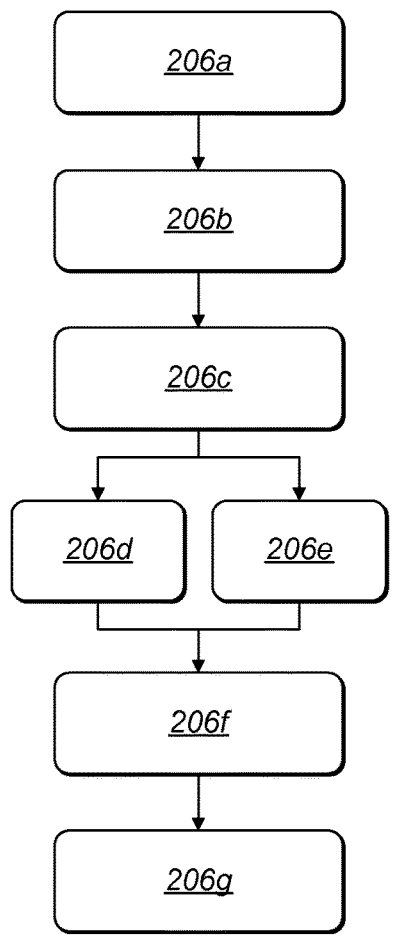
FIG. 5 is a flow chart showing the step of removing a lens from a mold portion, in accordance with the process shown in FIG. 4, in more detail.

FIG. 5 shows a flow chart of the method for removing a contact lens from a mold portion, according to the present invention. With reference also to FIG. 3, first, lens carrying mold portion 104 is aligned in step 206a with reciprocating member 118 of delensing station 100 by rotation of turntable 134. Mold portion 104 is clamped in step 206b, in position, by clamp 114. The vacuum head is aligned in step 206c with mold portion 104. Reciprocating member 118 and the vacuum head then move synchronously in step 206d. The synchronous reciprocal movement in step 206d continues until the annulus of mold portion 104 (see FIG. 2) is sufficiently stretched so that an edge portion of lens 102 detaches in step 206e from mold 104. During and after the synchronous movement in step 206d, air blowers direct air in step 206e under the edge of lens 102, increasing the separation between lens 102 and mold 104. Once the lens is sufficiently detached, it is lifted in step 206f from the mold by the vacuum head. The robotic arm then moves the vacuum head carrying lens 102 to a recess in the lens pallet and deposits lens 102 therein in step 206g. Once full, the lens pallet can be moved to another station for further processing.

While the present invention has been described and illustrated with reference to particular embodiments, it will be appreciated by those of ordinary skill in the art that the invention lends itself to many different variations not specifically illustrated herein.

For example, although in the example embodiment described above only one reciprocating member 18 is provided, in alternative example embodiments a plurality of reciprocating members are provided, allowing delensing of lenses from a plurality of lens mold portions simultaneously.

Where, in the foregoing description, integers or elements are mentioned which have known, obvious, or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient, or the like, are optional and do not limit the scope of the independent claims.

All patents and publications cited herein are incorporated herein by reference in their entireties.

The invention claimed is:

1. A method of removing a contact lens from a lens mold portion carrying a contact lens, the method comprising reciprocally displacing a region of the mold portion to thereby cause an edge portion of the contact lens to become detached from the mold portion, wherein the reciprocal displacement comprises a plurality of cycles, each cycle comprising motion in a first direction, followed by motion in a second, opposite direction.

2. The method according to claim 1, further comprising varying amplitude of reciprocal displacement of the region of the mold portion with respect to time.

3. The method according to claim 1, further comprising moving a suction head synchronously with reciprocal motion of the mold portion.

4. The method according to claim 1, further comprising blowing gas towards the edge portion of the contact lens.

5. The method according to claim 1, further comprising removing the contact lens from the lens mold portion comprising lifting the contact lens that is detached from the mold portion using suction force of a vacuum head.

6. An apparatus for removing a contact lens from a lens mold portion, the apparatus comprising:
a platform for retaining the lens mold portion; and
a reciprocating member arranged to reciprocally displace a region of said lens mold portion when the lens mold portion is retained by the platform, wherein the reciprocal displacement comprises a plurality of cycles, each cycle comprising motion in a first direction, followed by motion in a second, opposite direction.

7. The apparatus according to claim 6, further comprising a clamp arranged and configured such that, in use, the clamp acts on an outer circumference of the mold portion.

8. The apparatus according to claim 6, wherein the clamp defines a circular aperture.

9. The apparatus according to claim 6, wherein the reciprocating member comprises a non-planar end portion shaped to complement the mold portion.

10. The apparatus according to claim 9, wherein the reciprocating member is arranged such that, in use, the end portion contacts the center of the mold portion.

11. An apparatus according to claim 9, wherein the clamp defines a circular aperture, and the end portion of the reciprocating member and the circular aperture define an annulus on the mold portion.

12. The apparatus according to claim 11, wherein the annulus is outside an optic portion of the mold portion.

13. The apparatus according to claim 6, further comprising a suction head, wherein the suction head is arranged and configured such that, in use, the suction head is located on a side of the mold portion opposite the reciprocating member and moves substantially synchronously with the reciprocating member.

14. The apparatus according to claim 6, further comprising a blower arranged to blow air towards an edge of a lens attached to the mold portion.

15. The apparatus according to claim 6, wherein the mold portion is a female mold portion.

16. The apparatus according to claim 15, wherein the platform comprises a recess in which the female mold portion is supported.

17. A delensing station comprising an apparatus according to claim 6.

18. A manufacturing line for the production of contact lenses, comprising a turntable, a delensing station according to claim 17 located adjacent to the turntable, a demolding station located adjacent to the turntable for separating a convex mold portion from a concave mold portion carrying a contact lens, wherein the demolding station is spaced apart from the delensing station, and wherein the turntable is rotatable to move the concave mold portion carrying a contact lens from the demolding station to the delensing station.

19. The method according to claim 1, wherein the contact lens is a hydrogel contact lens.

20. The method according to claim 1, wherein the reciprocally displacing further comprises moving the end portion of a reciprocating member upwards, thereby exerting a force on the bottom of the mold portion and vertically displacing a central region of the mold portion, and then moving the end portion of the reciprocating member downward while maintaining contact with the bottom of the mold portion wherein the displaced region of the mold portion moves back towards its original position.

* * * * *